(12) United States Patent
Ohkuma et al.

(10) Patent No.: US 6,480,460 B1
(45) Date of Patent: Nov. 12, 2002

(54) ACTUATOR FOR AN OBJECTIVE LENS OF AN OPTICAL PICKUP FOR PREVENTING SKEW OF THE OPTICAL AXIS

(75) Inventors: Hideo Ohkuma; Koji Mitsumori, both of Chiba (JP)

(73) Assignee: Sony Corporation (JP)

( * ) Notice: Subject to any disclaimer, the term of this patent is extended or adjusted under 35 U.S.C. 154(b) by 1062 days.

(21) Appl. No.: 08/667,598

(22) Filed: Jun. 24, 1996

(30) Foreign Application Priority Data

Jun. 30, 1995 (JP) ............................................. 7-187801

(51) Int. Cl.$^7$ ................................................. G11B 7/00
(52) U.S. Cl. ..................................... 369/246; 369/44.16
(58) Field of Search ........................... 369/44.14–44.16, 369/244, 246; 359/813–814, 823–824

(56) References Cited

U.S. PATENT DOCUMENTS

| | | | | |
|---|---|---|---|---|
| 4,592,037 A | * | 5/1986 | Ohnuki ................. | 369/44.14 X |
| 4,991,161 A | * | 2/1991 | Ikegame et al. ..... | 369/44.16 X |
| 5,414,680 A | * | 5/1995 | Ikegame ............... | 369/44.15 X |
| 5,598,386 A | * | 1/1997 | Shtipelman et al. ..... | 369/44.14 |

* cited by examiner

Primary Examiner—W. R. Young
(74) Attorney, Agent, or Firm—Ronald P. Kananen, Esq.; Rader, Fishman & Grauer, PLLC

(57) ABSTRACT

A biaxial actuator for an objective lens of an optical pickup that prevents the occurrence of tangential skew when the objective lens is moved in a focussing direction, and thereby improves optical performance. The actuator includes a lens holder 11 that supports an objective lens 11a, elastic supporting members 13a, 13b, 13c, 13d each having one end fixed to the lens holder and the other end fixed to a fixed part 14. The supporting members support the lens holder movably in a radial direction of a disc-form recording medium D and two directions intersecting orthogonally with this direction. The elastic supporting members are provided such that at least one pair on both sides of the objective lens are lined up in the optical axis direction of the objective lens. The pair of elastic supporting members 13a, 13b have the spacing h1 of their fixing places 45, 46 on the lens holder side so set as to be narrower than the spacing h2 of their fixing places 47, 48 provided on the fixed part side. The elastic supporting members have expanding/contracting portions 41 that elastically slightly expand and contract along the direction in which the elastic supporting members extend.

26 Claims, 7 Drawing Sheets

ACTUATOR FOR AN OBJECTIVE LENS OF AN OPTICAL PICKUP FOR PREVENTING SKEW OF THE OPTICAL AXIS

BACKGROUND OF THE INVENTION

1. Field of the Invention

The present invention relates generally to optical pickups used for recording and/or reproducing information signals and, in particular, to a biaxial actuator for an objective lens of an optical pickup used for recording and reproducing signals of a CD, MD, digital video disc, or other information recording medium.

2. Description of the Related Art

Conventionally, reproduction or recording of information signals with respect to a disc-form recording medium, such as an optical disc, for example a so-called compact disc (CD) or an optomagnetic disc, has been carried out using an optical pickup. This optical pickup includes a semiconductor laser as a light source, an objective lens, an optical system and a light detector.

In an optical pickup, a light beam emitted from the semiconductor laser is converged through the optical system onto the recording surface of an optical disc by the objective lens. A return light beam from the optical disc is split from the light beam emitted from the semiconductor laser and guided to the light detector by the optical system. The position of the objective lens in the optical axis direction is adjusted so that the light beam emitted from the semiconductor laser follows displacements of the optical disc in a direction intersecting orthogonally with the plane direction of the optical disc occurring as a result of warp of the optical disc and the like and is focused at the recording surface of the optical disc. At the same time, the position of the objective lens in a direction intersecting orthogonally with the optical axis is adjusted so that the position of a spot on the optical disc of the light beam emitted from the semiconductor laser follows any eccentricity of the optical disc and snaking of a track formed on the optical disc.

This adjustment of the focusing position and the spot position on the recording surface of the light beam emitted from the semiconductor laser is carried out by adjusting the position in the optical axis direction of the objective lens and the position in a direction intersecting orthogonally with the optical axis of the objective lens. An electromagnetically driven actuator is used for positional adjustment of the objective lens.

This actuator is called an objective lens actuator or a biaxial actuator and includes a bobbin on which the objective lens is mounted and on which a plurality of coils are wound, a plurality of elastic supporting members and a driving part that generates driving forces by passing currents through the coils of the bobbin.

The bobbin is so supported with respect to a fixed part by the plurality of elastic supporting members that the position of the objective lens in the optical axis direction, namely the focusing position, and the position of the objective lens in a direction intersecting orthogonally with the optical axis, namely the tracking position, are adjustable. An example of this biaxial actuator is described below with reference to FIGS. 8 and 9.

This kind of biaxial actuator is constructed for example as shown in FIG. 8. That is, a biaxial actuator 1, as shown in FIG. 8, comprises a lens holder 2 on the front end of which is mounted an objective lens 2a and a coil bobbin (not shown in the drawing) attached to this lens holder 2 by means of an adhesive or the like.

The above-mentioned lens holder 2 is supported with respect to a fixed part 3 movably in two perpendicular directions, namely a tracking direction perpendicular to the paper surface and a focusing direction shown with the mark Fcs, by two pairs of wires 4 having one end fixed to both sides of this lens holder 2 and the other end fixed to the fixed part 3.

Also, on the above-mentioned coil bobbin are wound a coil for focusing and a coil for tracking (not shown in the drawing). By passing currents through the coils, magnetic flux produced in the coils mutually acts on magnetic flux from a yoke attached to the fixed part 3 and a magnet attached thereto (not shown in the drawing).

Also, the rear ends of the above-mentioned wires 4 pass through this fixed part 3 and are soldered to a base plate 5. Here, as shown in FIG. 9, to suppress vibration of these wires 4, these wires 4 are fitted through dampers 6 passed through holes 3a, 3b in the fixed part 3. In the case of FIG. 9, the dampers 6 are in contact with the base plate 5.

With a biaxial actuator 1 constructed like this, and driving voltages being supplied to the coils from outside, magnetic flux produced in the coils mutually acts on magnetic flux from the yoke and the magnet and this coil bobbin is moved with respect to the tracking direction and the focusing direction Fcs. In this way, the objective lens 2a mounted on the lens holder 2 is suitably moved with respect to the focusing direction and the tracking direction.

When the lens holder 2 is moved with respect to the focusing direction and the tracking direction in this way, this lens holder 2 tries to vibrate in relation to the movement direction, but by the damping action of the dampers 6 provided near the rear ends of the wires 4 the vibration is suppressed. As a result, the lens holder 2 is stopped in a predetermined position in a stable state.

A biaxial actuator constructed as shown in FIG. 10 is also known. That is, a biaxial actuator 7 comprises a lens holder 2 on the front end of which is mounted an objective lens 2a and a coil bobbin (not shown in the drawing) attached to this lens holder 2 by means of and adhesive or the like.

The above-mentioned lens holder 2 is movably supported with respect to a fixed part 3 in two perpendicular directions, namely a tracking direction perpendicular to the paper surface and a focusing direction, at least one pair of sheet springs 8 having one end fixed to both sides of this lens holder 2 and the other end fixed to the fixed part 3.

Also, on the above-mentioned coil bobbin are wound a coil for focusing and a coil for tracking (not shown in the drawing). By passing currents through the coils, magnetic flux produced in the coils mutually acts on magnetic flux from a yoke attached to the fixed part 3 and a magnet attached thereto (not shown in the drawing).

In this case, the rear end vicinity of each of the above-mentioned sheet springs 8, as shown in FIG. 11, has a crank part 8a bent into a crank shape toward the inner side and an extension part 8b extending from further forward than this crank part 8a toward the outer side and extending to the rear, and is provided with a projecting part 8c projecting from the rear end of this sheet spring 8 between the above-mentioned crank part 8c and the extension part 8b. A slit 8e is set in a direction intersecting orthogonally with the optical axis direction of the objective lens 2a between this projecting part 8c and the crank part 8a.

An anti-vibration tape 9 is affixed as a damper so as to completely cover this crank part 8a and the extension part 8b, and the projecting part 8c and slit 8e extending therebetween.

When the lens holder 2 is moved with respect to the focusing direction and the tracking direction in this way, this lens holder 2 tries to vibrate in relation to the movement direction, but by the damping action of the anti-vibration tape 9 provided in the vicinity of the rear ends of the sheet springs 8 the vibration is suppressed. As a result, the lens holder 2 is stopped in a predetermined position in a stable state.

However, in a biaxial actuator 7 of this kind of construction, when moving the lens holder 2 in the focusing direction, there have been the following kinds of problem. That is, FIGS. 12(*a*) and 12(*b*) show a state of the lens holder 2 being moved in the focusing direction and brought close to a disc D, and FIGS. 13(*a*) and 13(*b*) show a state of the lens holder 2 being moved in the focusing direction and moved away from the disc D.

As shown in FIGS. 12(*a*) and 12(*b*), when the lens holder 2 is brought close to the disc D, that is, moved in the direction shown by the arrow H upward in the drawing, a force F1 arises in upper and lower springs 8-1 and 8-2 because the place of the slit 8*e* (FIG. 11) contracts and expands in relation to the X direction (FIG. 12(*a*)), and in connection with the distance L a moment M1 (M1=F1L) acts on the lens holder 2. As a result of this, as shown in FIG. 12(*b*), the optical axis of the objective lens 2*a* shifts and so-called plus side tangential skew occurs.

Also, when the lens holder 2 is moved for focusing in the direction of the arrow I, as shown in FIG. 13, so as to be moved away from the disc D, oppositely from that discussed above, in the upper and lower springs 8-1 and 8-2 the place of the slit 8*e* (FIG. 11) contracts and expands in relation to the X direction (FIG. 13), a force F2 arises, and in connection with the distance L a moment M2 (M2=F2L) acts on the lens holder 2.

In this case also, as shown in FIG. 13(*b*), the optical axis of the objective lens 2*a* shifts and so-called minus side tangential skew occurs.

Because of this, in the biaxial actuator 7, there has been the problem that the occurrence of so-called dynamic skew, which is this kind of inclination of the optical axis of the lens holder 2, causes the optical performance of the optical pickup, such as the signal reading performance, to deteriorate.

In particular, of this dynamic skew, because the level of tolerance of the tangential skew described above in carrying out accurate signal reading and so on is small, prevention of the occurrence thereof has been sought.

SUMMARY OF THE INVENTION

An object of the present invention is to solve the problems associated with the aforementioned conventional optical pickup assembly.

More particularly, the present invention has an object of providing a biaxial actuator wherein when the objective lens is moved in the focusing direction, shifting of the optical axis of the objective lens is prevented, thereby reducing the occurrence of tangential skew and improving the optical performance of the actuator.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

The above-mentioned objects, according to this invention, maybe achieved by an actuator for an objective lens comprising a lens holder for holding the objective lens, a coil bobbin wound with a focusing coil and at least one tracking coil, the coil bobbin being fixed on the lens holder, magnet means for generating a magnetic field to the focusing coil and the tracking coil for driving the lens holder with the coils, and a plurality of elastic supporting members for movably supporting the lens holder in a direction parallel to the optical axis of the lens and a direction perpendicular to the optical axis of the lens, first end portions of the supporting members being fixed to the lens holder and second end portions of the supporting members being fixed to a fixed member. The supporting members are arranged such that, in a direction parallel to the optical axis of the lens, a first distance between the first end portions of the supporting members is shorter than a second distance between the second end portions of the supporting members.

According to the construction described above, the mutual spacing of the pair of elastic supporting members lined up in the optical axis direction of the objective lens is narrow at the lens holder side and wide at the fixed part side. By this construction, the biaxial actuator is given behavioral characteristics such that when the lens holder is moved in the optical axis direction, the so-called focusing direction, minus side tangential skew occurs when the lens holder is brought close to the disc-form recording medium, and plus side tangential skew occurs when the lens holder is moved away from the disc-form recording medium. Because these kind of behavioral characteristics are opposite to the behavioral characteristics occurring when expanding/contracting portions are provided in the elastic supporting members, reciprocal characteristics cancel each other out, and shifting of the optical axis of the objective lens is not caused during focusing movement.

In a preferred embodiment, the supporting members of the actuator each have a portion that expands and contracts in a direction parallel to a longitudinal direction of the supporting member. The expanding and contracting portions are provided on the second end portions of the supporting members. The expanding and contracting portions have a first portion that does not displace during focusing movement of the lens holder, a second portion disposed more on the lens holder side than the first portion, and a third portion connected to the first portion and second portion that displaces together with the second portion during focusing movement of the lens holder. The expanding and contracting portions each comprise a slit that is provided between the first portion and the second or third portion, and a viscous element is applied to the expanding and contracting portions. The supporting members are made of an electrically conductive material and are each electrically connected to at least one of the focusing coil and the tracking coil.

In another aspect of the present invention, the objects of the invention maybe achieved with an actuator for an objective lens, comprising a lens holder for holding the objective lens, a coil bobbin wound with a focusing coil and at least one tracking coil, the coil bobbin being fixed on the lens holder, magnet means for generating a magnetic field to the focusing coil and the tracking coil and for driving the lens holder with the coils, and supporting means for movably supporting the lens holder in a direction parallel to the optical axis of the lens and a direction perpendicular to the optical axis of the lens, the supporting means comprising two pair of elastic supporting members arranged at both sides of the objective lens and arranged so that the elastic supporting members in each pair are aligned in a direction parallel to the optical axis of the lens, first end portions of each of the supporting members being fixed to the lens holder and second end portions of each of the supporting members being fixed to a fixed member. A first distance between the first end portions of the supporting members in each pair of supporting members is shorter than a second distance between the second end portions of the supporting members in each pair, and the supporting members each have a portion that expands and contracts in a direction parallel to a longitudinal direction of the respective supporting member.

BRIEF DESCRIPTION OF THE DRAWINGS

The present invention will become more clearly appreciated as a description of the invention is made with reference to the accompanying drawings. In the drawings.

DETAILED DESCRIPTION OF THE PREFERRED EMBODIMENTS

A preferred embodiment of the invention will now be described in detail with reference to the accompanying drawings.

Because the embodiment described below is a preferred specific example of the invention, various technologically desirable limitations have been attached thereto; however, the scope of the invention is not limited to these forms as long as there is no mention of a feature particularly limiting the invention in the description below.

Figure 1:
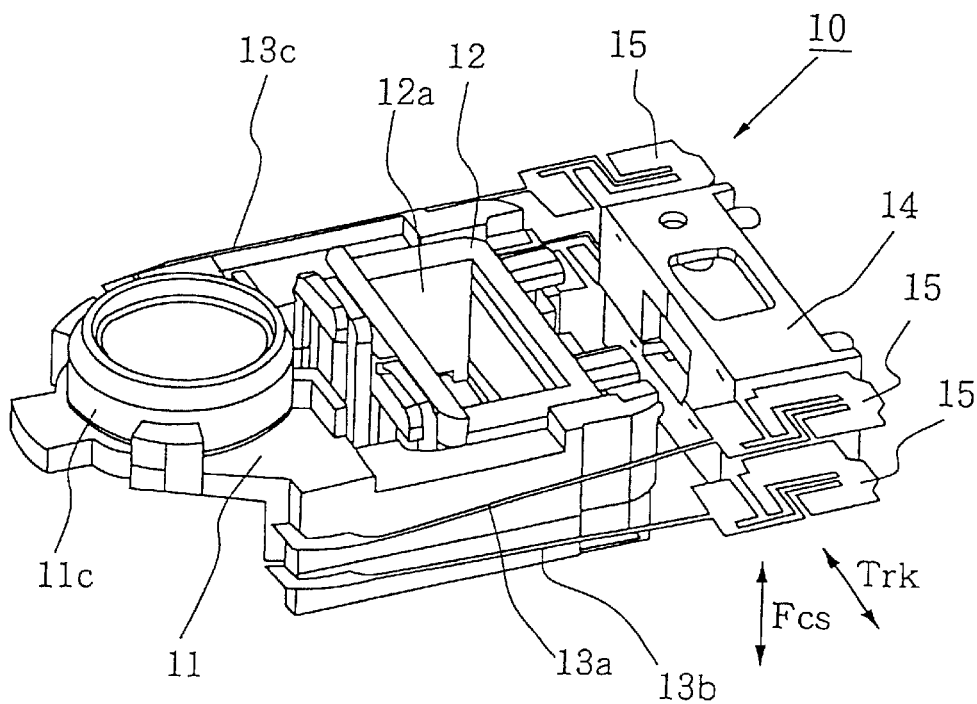
FIG. 1 is an outline perspective view showing the overall construction of an embodiment of a biaxial actuator for an optical pickup according to the invention seen from the front.
Figure 2:
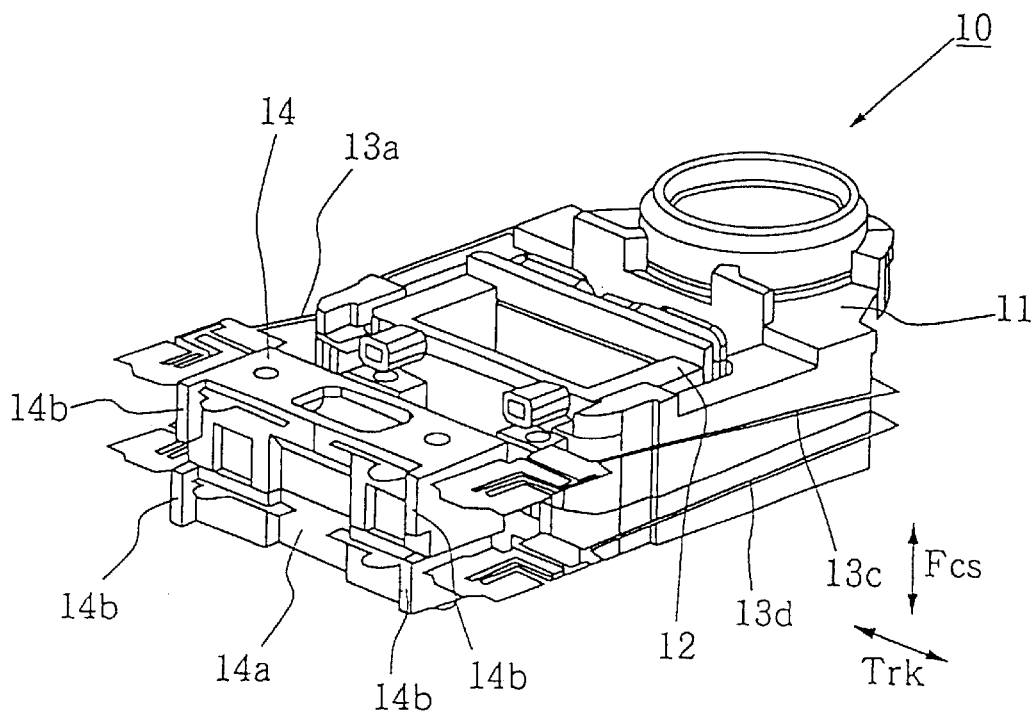
FIG. 2 is an outline perspective view showing the biaxial actuator of FIG. 1 seen from the rear.
Figure 3:
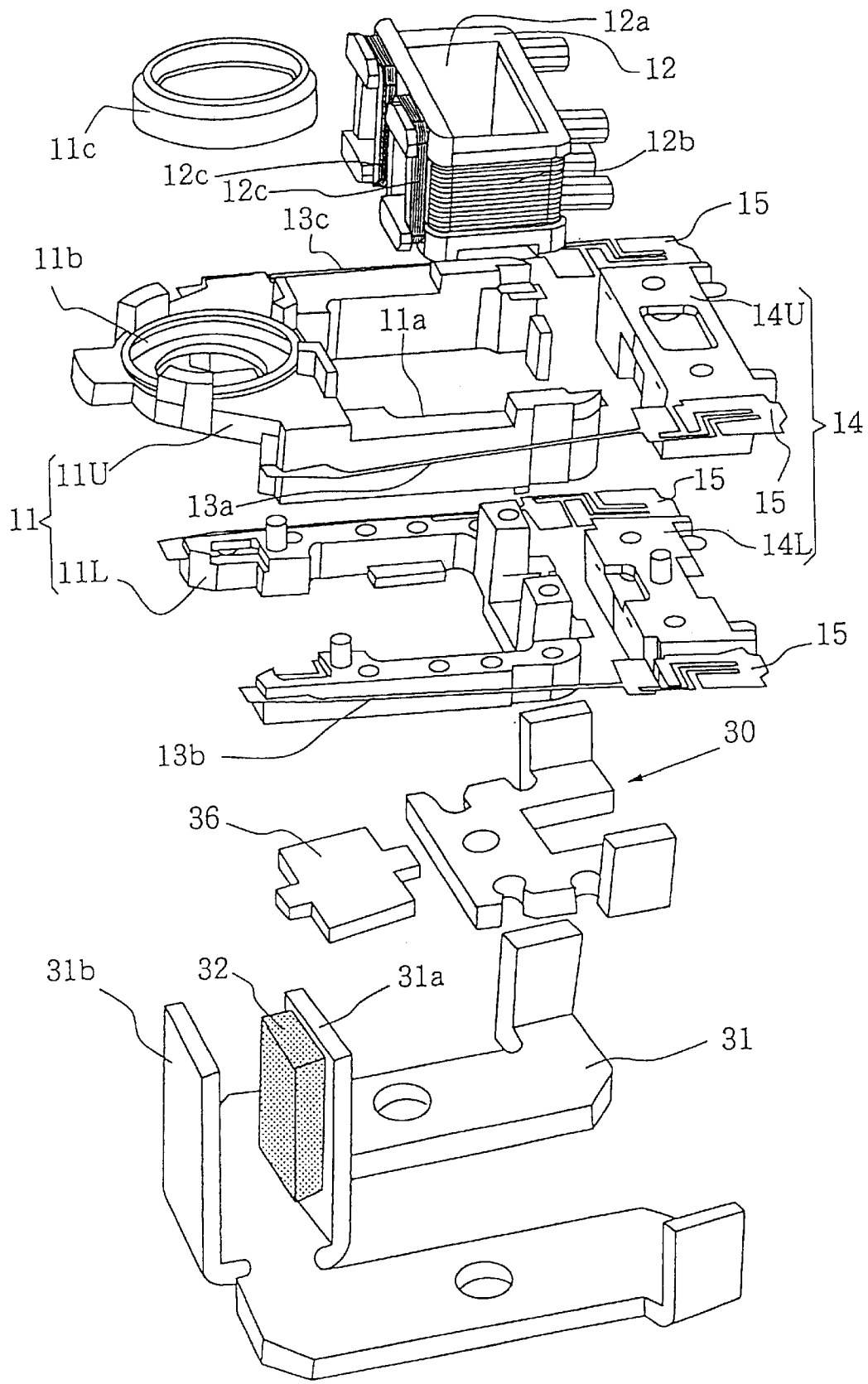
FIG. 3 is an exploded perspective view of the biaxial actuator of FIG. 1.

FIGS. 1 to 3 show a preferred embodiment of a biaxial actuator for an objective lens according to the invention. In FIGS. 1 to 3, a biaxial actuator 10 includes a lens holder 11, a coil bobbin 12, a plurality of elastic supporting members 13a, 13b, 13c, 13d, a fixed part 14 and a yoke 31.

The lens holder 11, in this embodiment, as shown in FIG. 3, preferably is split by a horizontal split line (parting line) into an upper part 11U and a lower part 11L, and mutually adhered with an adhesive. Also, as shown in FIG. 3, an opening 11a in which the coil bobbin is mounted and a recess 11b in which an objective lens 11c is mounted are formed in the lens holder 11. A hole through which a light beam emitted from a semiconductor laser or a returning light beam from the recording surface of an optical disc passes is formed in the bottom of this recess 11b. An objective lens 11c is mounted in the recess 11b of the lens holder 11 by means of an adhesive or the like.

Also, the lens holder 11 is supported movably in a focusing direction Fcs and a tracking direction Trk by the elastic supporting members 13a, 13b, 13c, 13d.

The coil bobbin 12 has formed therein an opening 12a into which is inserted a magnetic circuit made up of the yoke 31 integral with a base and a magnet 32 mounted on the inner surface of an inner yoke 31a of the yoke 31. The coil bobbin 12 is provided with a coil for focusing 12b and a pair of coils for tracking 12c.

The coil for focusing 12b is wound on the coil bobbin 12 along an axis parallel with the optical axis of the objective lens 11c. The coils for tracking 12c are formed by winding coils elliptically or rectangularly. The coils for tracking 12c are mounted on one side surface of the coil for focusing 12b. The upper surface of the coil bobbin 12 is covered by a yoke bridge 36. This yoke bridge 36 may constitute a closed circuit together with the yoke part of the above-mentioned magnetic circuit. The coil bobbin 12 is mounted in the opening formed in the lens holder 11 with the coil for focusing 12b and the coils for tracking 12c mounted thereon.

The elastic supporting members 13a, 13b, 13c, 13d preferably have electrical conductivity and furthermore have elasticity. For example, a material such as phosphor bronze, beryllium copper, titanium copper, tin-nickel alloy, stainless steel is used for the elastic supporting members 13a–13d. In the preferred embodiment, the elastic supporting members are formed from thin sheet metal as sheet spring suspensions fixed between the lens holder 11 and the fixed part 14 in parallel with each other.

Figure 6:
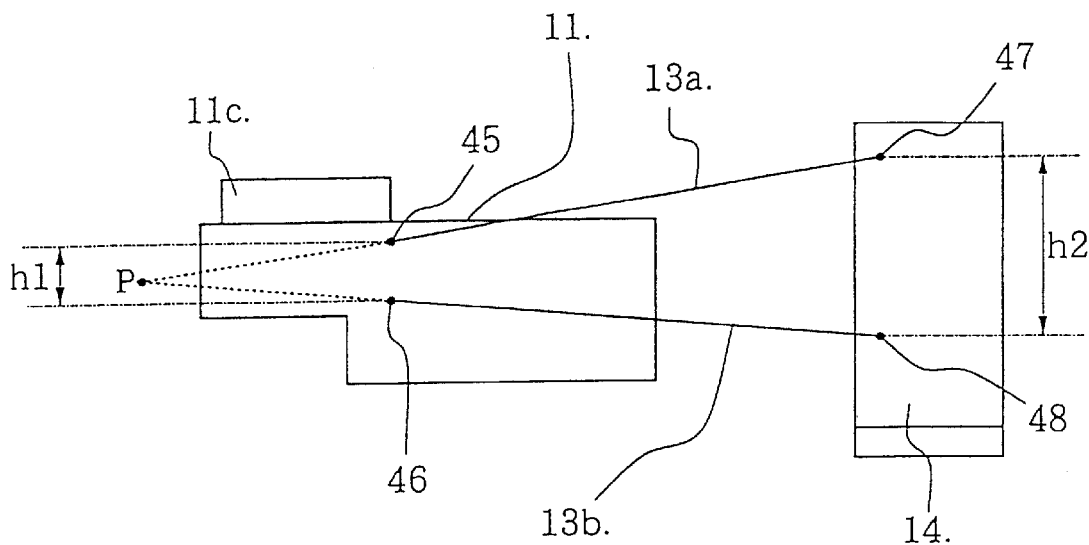
FIG. 6 is an outline side view showing a fixing construction of elastic supporting members of the biaxial actuator of FIG. 1.

FIG. 6 is a view schematically showing the fixing structure of these elastic supporting members 13a and 13b. The elastic supporting members 13c and 13d are provided on the side surface on the opposite side from the supporting members 13a and 13b and are also of the same construction. The elastic supporting members 13a and 13b have one end fixed to the lens holder 11 at fixing places 45, 46, respectively. The other ends of these elastic supporting members 13a and 13b are fixed to the fixed part 14 at fixing places 47, 48. As a result, these elastic supporting members 13a and 13b become a pair lined up in the optical axis direction of the objective lens 11c and are fixed to side surfaces of the lens holder 11 and the fixed part 14.

The spacing hi of the fixing places 45 and 46 of the elastic supporting members 13a and 13b on the lens holder side is narrower than the spacing h2 of the fixing places 47 and 48 on the fixed part 14 side. When the elastic supporting members 13a and 13b are extended toward the lens holder 11 front end side (to the left in the drawing) these imaginary extension lines intersect at a certain point P as shown with dotted lines.

The elastic supporting members 13a, 13b, 13c, 13d may be constructed so as to supply driving currents from an outside current supplying means (not shown in the drawings) to the coil for focusing 12b and the coils for tracking 12c wound on the coil bobbin 12.

With the lens holder 11 and the mounting part 14 linked by the four elastic supporting members 13a, 13b, 13c, 13d, the mounting part 14 is mounted on an adjusting plate 30. This adjusting plate 30 is for adjusting the fixed position of the mounting part 14 when the biaxial actuator is being assembled. The adjusting plate 30 is fixed to a base 31 formed integrally with the yoke by soldering or the like. The mounting part 14 is mounted to the adjusting plate by inserting a boss provided on the fixed part 14 into a hole in the adjusting plate 30, as shown in the drawing, and fixing it with adhesive or the like.

Here, a pair of yokes 31a, 31b constituting the above-mentioned magnetic circuit are provided on the base 31 by bending end portions of the base 31 on the objective lens side respectively upward. There is provided a permanent magnet 32 mounted on the surface of the yoke 31a facing the other yoke 31b. As a result, a magnetic circuit is formed by the pair of yokes and the permanent magnet.

When the mounting part 14 is mounted on the base, as described above, the coil for focusing 12b and the coils for tracking 12c mounted on the coil bobbin 12 are inserted into a gap between the permanent magnet 32 and the other yoke 31b. At the same time, one yoke 31a and the permanent magnet 32 are inserted into the opening of the coil bobbin 12.

Figure 4:
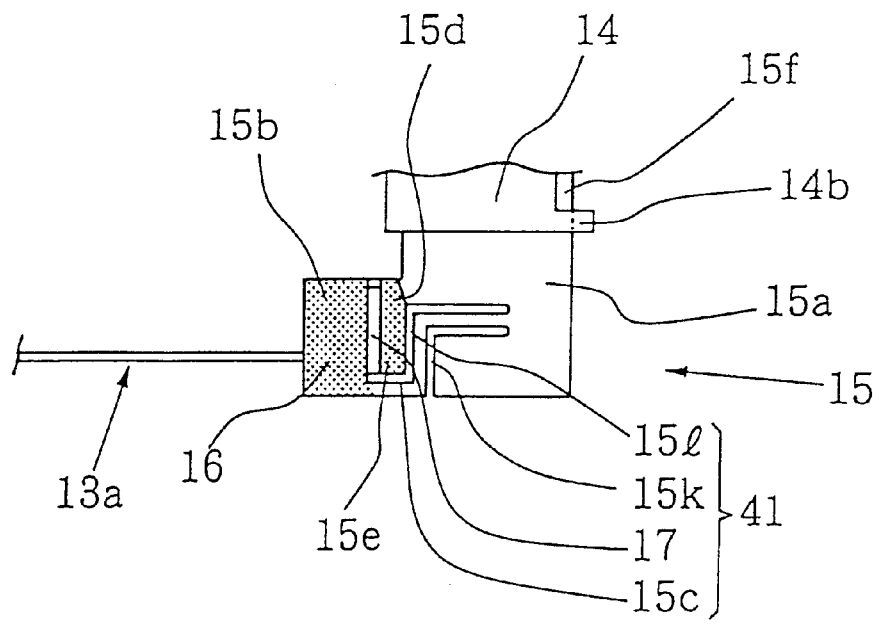
FIG. 4 is an enlarged plan view showing a fixed part side end part region of an elastic supporting member in the biaxial actuator of FIG. 1.
Figure 5:
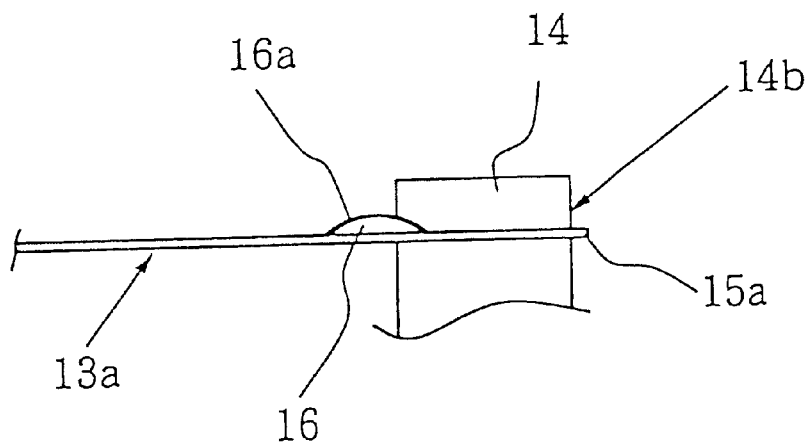
FIG. 5 is an enlarged perspective view showing a fixed part side end part region of an elastic supporting member in the biaxial actuator of FIG. 1.

The elastic supporting members 13a, 13b, 13c, 13d are constructed in their fixed part 14 side end part regions, as shown in FIGS. 4 and 5. That is, as shown in FIGS. 4 and 5, the fixed part 14 side end part region of the elastic supporting member 13a is, for example, formed overall in a rectangle.

The end part region 15 has a first non-moving part 15a as a first part fixed to the fixed part 14, and a movable part 15b as a second part connected to the main part of the elastic supporting member 13a. The end part region 15 has an elastic part 15c as a third part extending from near the rear part (in the drawing, the right edge part) of the non-moving part 15a in the shape of a crank and connected to the movable part 15b. The end part region 15 also has a first viscous body receiving part 15e disposed on the rear part of the movable part 15b and connected to the non-moving part 15a by way of an angle part 15d. The above-mentioned movable part 15b is formed relatively wide, and the surface thereof is provided as a second viscous body receiving part.

The first viscous body receiving part 15e does not displace during focusing or during tracking and is fixedly held because it is connected to the non-moving part 15a. The body receiving part 15e is formed facing the movable part 15b across a small gap 17 formed parallel with a direction intersecting orthogonally with the direction in which the elastic supporting member 13a extends.

A gap 15k is formed between the non-moving part 15a and the elastic part 15c, in a direction intersecting orthogonally with the direction in which the elastic supporting member 13a extends. A gap 15l is provided between this elastic part 15c and the first viscous body receiving part 15e. The gaps 17, 15k, 15l, together with the elastic part 15c, constitute an expanding/contracting part 41 that expands and contracts within the range of the widths of the gaps when the lens holder 11 is moved in the focusing direction Fcs.

With respect to the first viscous body receiving part 15e and the movable part 15b, which is a second viscous body receiving part, a viscous body 16 is provided so as to extend across the gap 17 and connect the two viscous body receiving parts 15e, 15b. This viscous body 16 is, for example, an ultraviolet ray hardening type viscous body. The viscous body 16 extends over the whole of the first viscous body receiving part 15e and the second viscous body receiving part 15b and is stable at a substantially constant thickness. In this state, by irradiating ultraviolet rays, the above-mentioned viscous body 16 is hardened, and the first viscous body receiving part 15e and the second viscous body receiving part 15b are connected by the hardened viscous body 16.

With respect to this, as shown in FIGS. 2 and 4, the fixed part 14 is provided with a viscous body flow preventing wall 14b where it is adjacent to the end part region 15 of the elastic supporting member 13a. This viscous body flow preventing wall 14b is preferably formed integrally with respect to the fixed part 14. The viscous body flow preventing wall 14b is formed with respect to the peripheral edge 15f of the elastic supporting member 13a extending beyond the peripheral edge 15f.

The biaxial actuator 10 of this embodiment is constructed as described above. Driving currents controlled on the basis of a focusing servo signal and a tracking servo signal are respectively supplied to the coil for focusing 12b and the coils for tracking 12c wound on the coil bobbin 12.

In this way, by a direct current electromagnetic field of the magnetic circuit and an alternating electromagnetic field arising from the coil for focusing 12b and the coils for tracking 12c, the lens holder 11, that is, the objective lens 11c, is driven in the focusing direction Fcs and the tracking direction Trk.

Figure 7:
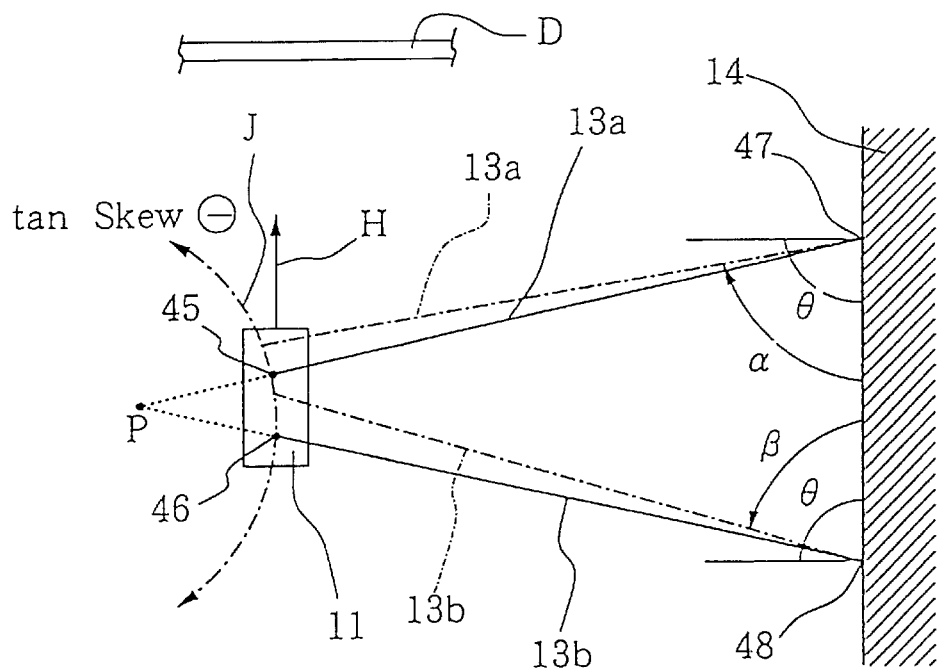
FIG. 7 is a principle view for explaining behavioral characteristics of the biaxial actuator of FIG. 6.
Figure 8:
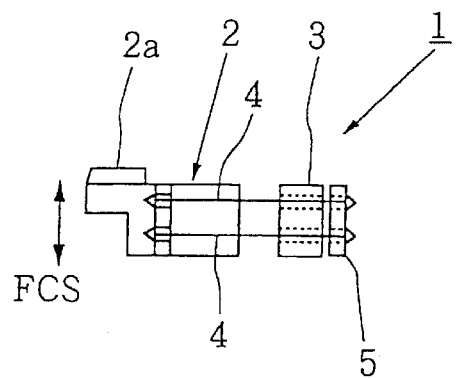
FIG. 8 is an outline side view showing an example of a conventional biaxial actuator.
Figure 9:
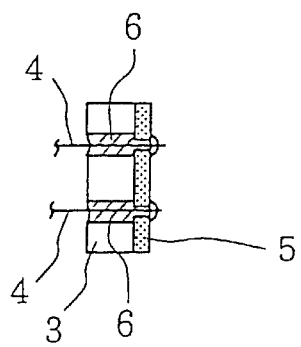
FIG. 9 is a partial side sectional view showing fixed parts of elastic supporting members of the biaxial actuator of FIG. 8.
Figure 10:
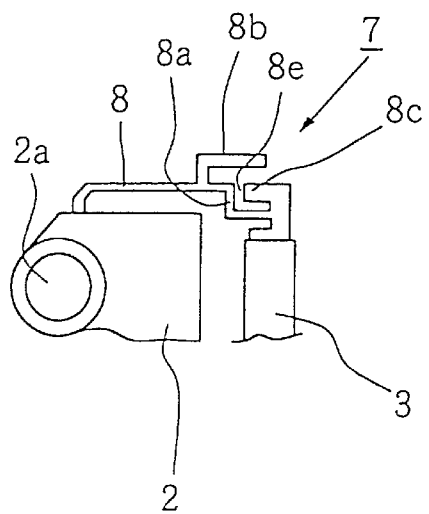
FIG. 10 is a partial plan view of the biaxial actuator of FIG. 8.
Figure 11:
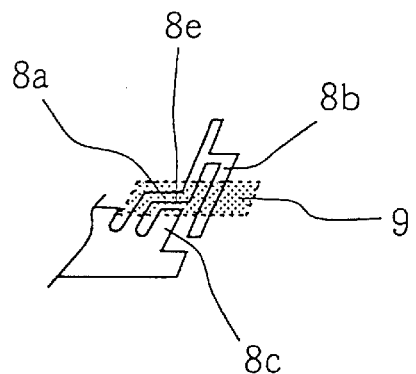
FIG. 11 is an enlarged perspective view showing a fixed part side end part of an elastic supporting member of the biaxial actuator of FIG. 8.
Figure 12A:
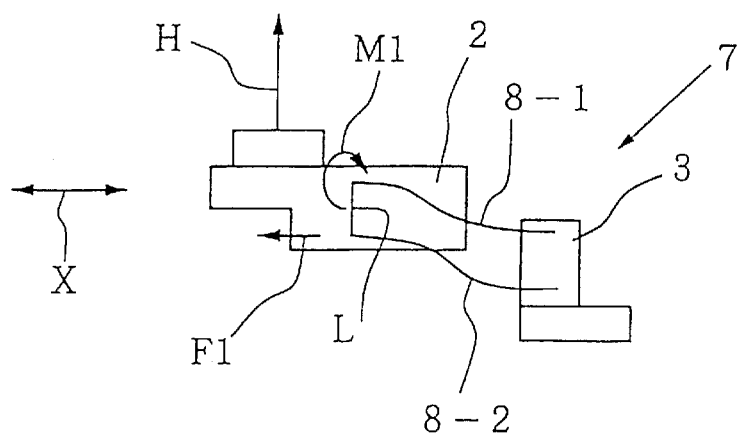
FIGS. 12(a) and 12(b) are outline views showing behavioral characteristics during focusing movement of a conventional biaxial actuator.
Figure 12B:
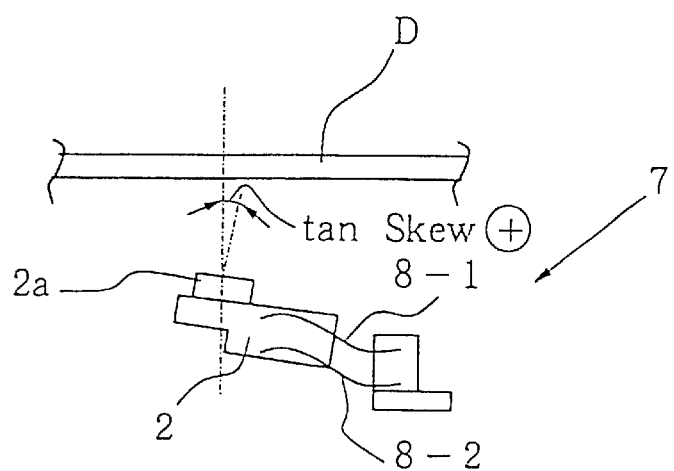
Figure 13A:
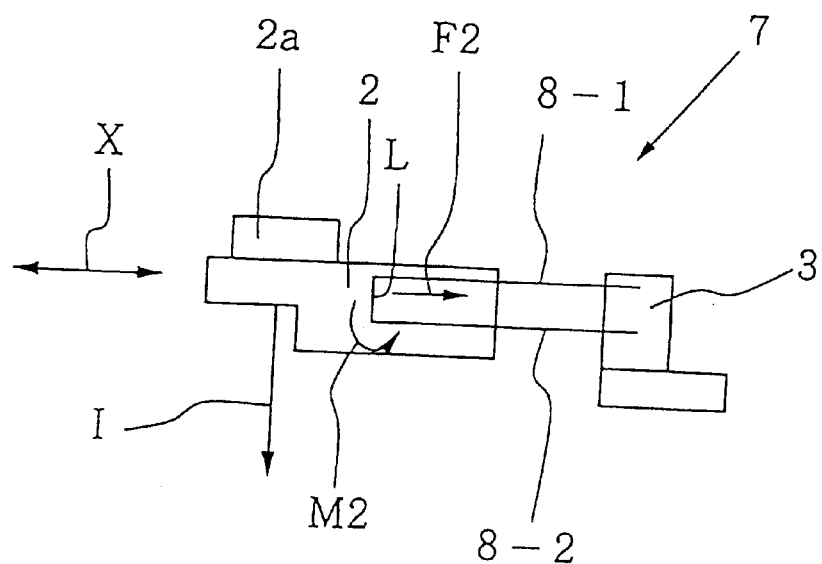
FIGS. 13(a) and 13(b) are outline views showing behavioral characteristics during focusing movement of a conventional biaxial actuator.
Figure 13B:
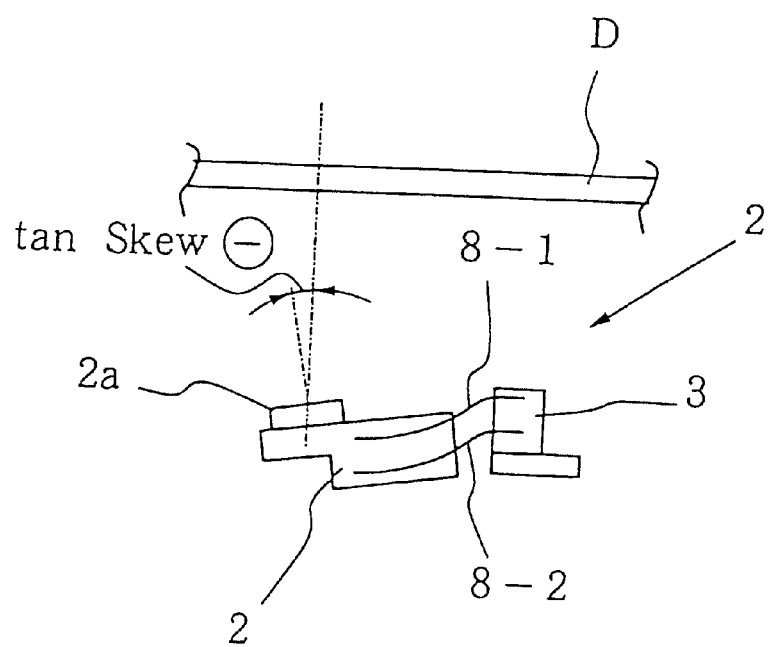

In the biaxial actuator of this embodiment, when the lens holder 11 is driven in the above-mentioned focusing direction Fcs, behavioral characteristics of the kind shown in FIG. 7 are imparted.

FIG. 7 is a principle drawing for explaining the behavioral characteristics of the lens holder 11. In the drawing, an example is shown wherein an electromagnetic driving force acts on the lens holder 11, and a force acts in the direction shown by the arrow H, i.e., the direction approaching the disc D in the focusing direction.

Here, one end of the elastic supporting members 13a and 13b is fixed to the lens holder 11 at fixing places 45 and 46, as described above. The other end side of the elastic supporting members 13a and 13b is fixed to the fixing places 47 and 48. For purposes of illustration in FIG. 7, it will be assumed that the elastic supporting members 13a and 13b do not expand and contract.

In FIG. 7, the angle formed by the elastic supporting member 13a and the vertical front surface of the fixed part 14 is represented by a. When this elastic supporting member 13a has become horizontal in the drawing, because the length of this elastic supporting member 13a does not change, the lens holder 11 side fixing place 45 moves to a position farthest away from the fixed part 14. The angle formed by the elastic supporting member 13a and the vertical front surface of the fixed part 14 in this state will be made $\theta$.

When the lens holder 11 is moved for focusing in the direction approaching the disc D, the elastic supporting member 13a moves to the position shown with broken lines in the drawing. At this time the angle α formed by the elastic supporting member 13a and the vertical front surface of the fixed part 14 gradually approaches $\theta$ and consequently the fixing place 45 moves upward in the drawing and moves away from the fixed part 14.

The elastic supporting member 13b, on the other hand, when the lens holder 11 receives a force in the arrow H direction, the angle β formed by the elastic supporting member 13b and the vertical front surface of the fixed part 14 decreases and the difference between it and θ increases. Because of this, as shown in the drawing, the lens holder side fixing place 46 of the elastic supporting member 13b gradually moves upward and the distance between it and the fixed part 14 gradually decreases.

In this way, the lens holder side fixing places 45 and 46 of the elastic supporting members 13a and 13b, when it is assumed that the elastic supporting members 13a and 13b do not expand and contract, follow a locus J in the shape of a circular arc having the point P as its center. As a result the lens holder 11 is imparted with a characteristic that it gives rise to a minus side tangential skew.

Also, when the lens holder 11 is moved in a focusing direction opposite the direction H so that it moves away from the optical disc D (downward in the drawing), the lens holder 11 is imparted with a characteristic that it gives rise to a plus side tangential skew.

However, when the elastic supporting members 13a and 13b, as explained with FIG. 4, are provided with the expanding/contracting part 41 and the elastic supporting members have this kind of expanding and contracting function, as explained with FIGS. 12(a) and 12(b) and FIGS. 13(a) and 13(b), behavioral characteristics opposite to those described above are imparted to the lens holder 11.

Therefore, the biaxial actuator 10 of this embodiment, by the fixing places of the elastic supporting members being made of the construction altered as described above, even if they are provided with the expanding/contracting part 41, because the tangential skews arising on the basis of their respective constructions are opposite, these characteristics cancel each other out. Thus, during focusing movement the lens holder 11 is moved in parallel without the objective lens 11c giving rise to optical axis falling.

In this way, with the biaxial actuator of this embodiment, it is possible to effectively prevent tangential skew, of which the level of tolerance in fulfilling signal readout performance of the optical pickup is extremely low, and excellent optical performance can be provided.

Also, with the biaxial actuator 10 of this embodiment, by providing the expanding/contracting part 41, it is also possible to provide the following kind of advantageous action. That is, because as a damper the viscous body 16 is coated in the fixed part 14 side end part region 15 of the elastic supporting members 13a, 13b, 13c, 13d so as to extend across the gap 17 between the first viscous body receiving part 15e and the second viscous body receiving part 15b and hardened, a desired damping characteristic can be obtained.

As a result, for example during focusing, the movable part 15b deforms in the vertical direction with respect to the first viscous body receiving part 15e, and vibration caused by that deformation is damped by the viscous body 16. Also, during tracking, the movable part 15b deforms so as to oscillate with respect to the first viscous body receiving part 15e. Vibration caused by that deformation is damped by the viscous body 16.

Here, when the viscous body 16 is coated and hardened, even if unhardened portions have arisen in the surface of the viscous body 16 due to oxygen obstruction, these hardened portions sometimes flow out onto the non-moving part 15a of the end part region 15 of the elastic supporting member.

In particular, when as in this embodiment the lens holder 11, as shown in FIG. 3, is split by a horizontal split line (parting line) into an upper part 11U and a lower part 11L, and mutually adhered with an adhesive, it is conceivable that unhardened portions of the viscous body 16 will flow along this parting line. However, because these unhardened portions of the viscous body are obstructed by the viscous body flow preventing wall 14b formed in the fixed part 14, they do not flow out onto the side edge 15f of the elastic supporting member positioned at the side of the fixed part 14.

Therefore, because unhardened portions of the viscous body 16 do not flow from the side edges 15f of the elastic supporting members at the side of the fixed part 14 along outsert lines or parting lines of the fixed part 14 and also the border of the upper part 11U and the lower part 11L, it does not flow into the adhered surface 14b, i.e., the adhered surface of the border of the upper part 11U and the lower part 11L. In this way, a decrease in the adhesive strength of this adhered surface and the adhered parts coming apart can be prevented.

In the embodiment described above, the elastic supporting members 13a, 13b, 13c, 13d were described as simply being respectively fixed to the lens holder 11 and the fixed part 14, but it is clear that they may be formed integrally with the lens holder 11 and the fixed part 14 by insert molding or the like. Also, although the lens holder 11 is split into an upper part 11U and a lower part 11L, it is clear that it may alternatively be integrally formed.

As described above, according to this invention, it is possible to provide a biaxial actuator wherein when moved in the focusing direction, shifting of the optical axis of the objective lens, especially the occurrence of tangential skew, is prevented, and the optical performance is thereby improved.

It will be appreciated that the present invention is not limited to the exact construction that has been described above and illustrated in the accompanying drawings, and that various modifications and changes can be made without departing from the spirit and scope of the present invention. It is intended that the scope of the invention only be limited by the appended claims.

What is claimed is:

1. An actuator for an objective lens, comprising:
   a lens holder for holding said objective lens;
   a coil bobbin wound with a focusing coil and at least one tracking coil, said coil bobbin being fixed on said lens holder;
   a magnetic field generator for generating a magnetic field for driving said lens holder with said focusing coil and said at least one tracking coil; and
   a plurality of elastic supporting members for supporting said lens holder such that said lens holder is moveable in a direction parallel to an optical axis of said lens and a direction perpendicular to the optical axis of said lens, first end portions of said supporting members being fixed to said lens holder and second end portions of said supporting members being fixed to a fixed member;
   wherein said supporting members are made of a material containing at least one metal and each have an expanding and contracting portion which expands or contracts to vary the length of the supporting member when said lens holder is driven to prevent a shift of said optical axis with respect to said fixed member.

2. An actuator for an objective lens according to claim 1, wherein said supporting members are arranged such that, in a direction parallel to the optical axis of said lens, a first distance between said first end portions of said supporting members is shorter than a second distance between said second end portions of said supporting members.

3. An actuator for an objective lens according to claim 1, wherein said expanding and contracting portions are provided on said second end portions of said supporting members.

4. An actuator for an objective lens according to claim 1, wherein said expanding and contracting portions have a first portion that does not displace during focusing movement of said lens holder, a second portion disposed between said lens holder and said first portion, and a third portion connected to said first portion and said second portion that displaces together with said second portion during focusing movement of said lens holder.

5. An actuator for an objective lens according to claim 4, wherein said expanding and contracting portions each comprise a slit that is provided between said first portion and said second or third portion.

6. An actuator for an objective lens according to claim 1, wherein a viscous element is applied to said expanding and contracting portions for damping vibrations in said supporting members.

7. An actuator for an objective lens according to claim 1, wherein said supporting members are made of an electrically conductive material and are each electrically connected to at least one of said focusing coil and said at least one tracking coil.

8. An actuator for an objective lens according to claim 1, wherein said expanding and contracting portion comprises a member having therein two gaps each of which have a first section and a second section, said first section being perpendicular to a longitudinal axis of said supporting members and said second section being parallel to a longitudinal axis of said supporting members.

9. An actuator for an objective lens according to claim 8, wherein one of said gaps opens on a first side of said member of said expanding and contracting portion and one of said gaps opens on a second side of said member of said expanding and contracting portion opposite to said first side.

10. An actuator for an objective lens according to claim 1, wherein said material containing at least one metal is an alloy.

11. An actuator for an objective lens according to claim 10, wherein said material containing at least one metal is any one of phosphor bronze, beryllium copper, titanium copper, tin-nickel alloy or stainless steel.

12. An actuator for an objective lens, having a lens holder for holding said objective lens; a coil bobbin wound with a focusing coil and at least one tracking coil, said coil bobbin being fixed on said lens holder; a magnetic field generator for generating a magnetic field for driving said lens holder with said focusing coil and said at least one tracking coil; and a plurality of elastic supporting members for supporting said lens holder such that said lens holder is moveable along an arc a tangent of which is in a direction parallel to an optical axis of said lens, said optical axis shifting with respect to a fixed member as said lens holder moves about said arc, wherein first end portions of said supporting members are fixed to said lens holder and second end portions of said supporting members are fixed to said fixed member; the improvement comprising:

an expanding and contracting portion associated with each of said supporting members which expands or contracts along a longitudinal direction of said supporting members to prevent a shift of said optical axis when said lens holder is driven.

13. An actuator for an objective lens according to claim 12, wherein said supporting members are arranged such that, in a direction parallel to the optical axis of said lens, a first distance between said first end portions of said supporting members is shorter than a second distance between said second end portions of said supporting members.

14. An actuator for an objective lens according to claim 12, wherein said expanding and contracting portions are provided on said second end portions of said supporting members.

15. An actuator for an objective lens according to claim 12, wherein a viscous element is applied to said expanding and contracting portions for damping vibrations in said supporting members.

16. An actuator for an objective lens according to claim 12, wherein said supporting members are made of an electrically conductive material and are each electrically connected to at least one of said focusing coil and said at least one tracking coil.

17. An actuator for an objective lens according to claim 12, wherein said expanding and contracting portion comprises a member having therein two gaps each of which have a first section and a second section, said first section being perpendicular to a longitudinal axis of said supporting members and said second section being parallel to a longitudinal axis of said supporting members.

18. An actuator for an objective lens according to claim 17, wherein one of said gaps opens on a first side of said member of said expanding and contracting portion and one of said gaps opens on a second side of said member of said expanding and contracting portion opposite to said first side.

19. An actuator for an objective lens, comprising:

a lens holder for holding said objective lens;

a coil bobbin wound with a focusing coil and at least one tracking coil, said coil bobbin being fixed on said lens holder;

a magnetic field generator for generating a magnetic field for driving said lens holder with said focusing coil and said at least one tracking coil; and a plurality of elastic supporting members for supporting said lens holder such that said lens holder is moveable in a direction parallel to an optical axis of said lens and a direction perpendicular to the optical axis of said lens, first end portions of said:supporting members being fixed to said lens holder and second end portions of said supporting members being fixed to a fixed member;

wherein said supporting members each comprise an expanding and contracting portion which expands or contracts to vary the length of the supporting member when said lens holder is driven to prevent a shift of said optical axis with respect to said fixed member, wherein all of said supporting members are fixed to said fixed member in a common plane.

20. An actuator for an objective lens according to claim 19, wherein said supporting members are arranged such that, in a direction parallel to the optical axis of said lens, a first distance between said first end portions of said supporting members is shorter than a second distance between said second end portions of said supporting members.

21. An actuator for an objective lens according to claim 19, wherein said expanding and contracting portions are provided on said second end portions of said supporting members.

22. An actuator for an objective lens according to claim 19, wherein a viscous element is applied to said expanding and contracting portions for damping vibrations in said supporting members.

23. An actuator for an objective lens according to claim 19, wherein said supporting members are made of an electrically conductive material and are each electrically connected to at least one of said focusing coil and said at least one tracking coil.

24. An actuator for an objective lens according to claim 19, wherein said expanding and contracting portion comprises a member having therein two gaps each of which have a first section and a second section, said first section being perpendicular to a longitudinal axis of said supporting members and said second section being parallel to a longitudinal axis of said supporting members.

25. An actuator for an objective lens according to claim 24, wherein one of said gaps opens on a first side of said member of said expanding and contracting portion and one of said gaps opens on a second side of said member of said expanding and contracting portion opposite to said first side.

26. An actuator for an objective lens, comprising:

a lens holder for holding said objective lens;

a coil bobbin wound with a focusing coil and at least one tracking coil, said coil bobbin being fixed on said lens holder;

a magnetic field generator for generating a magnetic field for driving said lens holder with said focusing coil and said at least one tracking coil; and a plurality of elastic supporting members for supporting said lens holder such that said lens holder is moveable in a direction parallel to an optical axis of said lens and a direction perpendicular to the optical axis of said lens, first end portions of said supporting members being fixed to said lens holder and second end portions of said supporting members being fixed to a fixed member;

wherein said supporting members are made of an electrically conductive material and each have an expanding and contracting portion which expands or contracts to vary the length of the supporting member when said lens holder is driven to prevent a shift of said optical axis with respect to said fixed member.

* * * * *

UNITED STATES PATENT AND TRADEMARK OFFICE
CERTIFICATE OF CORRECTION

PATENT NO. : 6,480,460 B1 Page 1 of 1
DATED : November 12, 2002
INVENTOR(S) : Hideo Ohkuma It is certified that error appears in the above-identified patent and that said Letters Patent is hereby corrected as shown below:

<u>Column 12,</u>
Line 42, "said:supporting" should read -- said supporting --.

Signed and Sealed this

First Day of July, 2003

JAMES E. ROGAN
*Director of the United States Patent and Trademark Office*